C. F. Dean
Nail Extractor

Nº 86,285. Patented Jan. 26, 1869.

Witnesses:
S. N. Piper
J. R. Snow

Inventor:
Chester F. Dean
R. W. Eady
attorn

CHESTER F. DEAN, OF ST. JOHNSBURY, VERMONT, ASSIGNOR TO HIMSELF, HORACE PADDOCK, AND HALSEY R. PADDOCK, OF SAME PLACE.

*Letters Patent No. 86,285, dated January 26, 1869.*

IMPROVEMENT IN BARREL-HOOP LOOSENER AND NAIL-EXTRACTOR.

The Schedule referred to in these Letters Patent and making part of the same.

*To all persons to whom these presents may come:*

Be it known that I, CHESTER F. DEAN, of St. Johnsbury, of the county of Caledonia, of the State of Vermont, have invented a new and useful improvement, which I term a Barrel-Hoop Loosener and Nail-Extractor; and do hereby declare the same to be fully described in the following specification, and represented in the accompanying drawings, of which—

Figure 1:
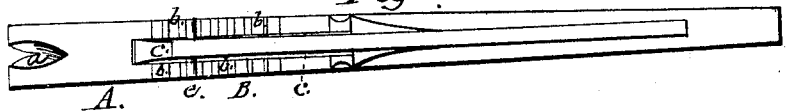
Figure 2:
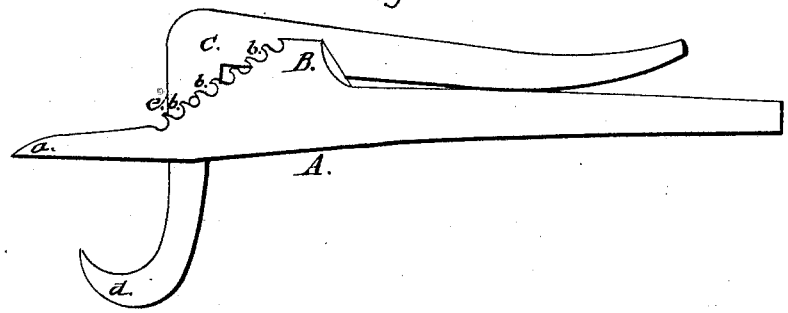
Figure 4:
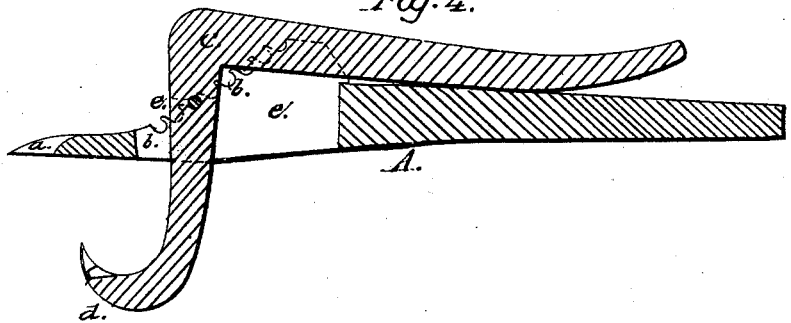
Figure 3:
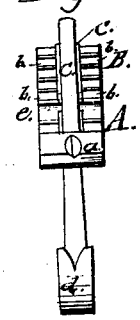

Figure 1 is a top view,
Figure 2, a side elevation,
Figure 3, a front-end view, and
Figure 4, a longitudinal section of it.

The special object of the implement is the loosening of a hoop, and the confining-nails thereof, of a barrel, in order to enable a person to remove such hoop, or a band, of the barrel from the body or staves.

In the drawings—

A denotes a lever or bar, formed with a claw, *a*, at one end, and also with a projection, B, extended from it in manner as represented.

The front edge of the said projection is inclined at an obtuse angle with the top of the claw *a*, and is provided with a series of notches, as shown at *b*.

A slot, *c*, extends down through the projection and the lever, and receives the shorter arm of a bent lever, C, which is formed in manner as shown in the drawings.

This arm, at its lower part, is constructed with a hooked claw, *d*, and, besides, it has a fulcrum or pin, *e*, which projects in opposite directions from it, and is disposed on it, as shown in figs. 1 and 2.

The series of notches, arranged as represented, answers as a series of bearings for the said fulcrum, by which the hooked claw may be adjusted to various positions, relatively to the claw or projection *a*, or be brought into the proper relation therewith to adapt the implement to the loosening of a hoop.

In using the implement, the part *a* is to be laid on the upper edge of a stave of a barrel. The lever B is next to be adjusted, so as to cause its claw to pass under and against the hoop, after which the longer arm of the lever B is to be borne toward that of the lever A, so as to cause the hooked claw to pass between the hoop and the barrel, and catch the hoop. Next, the longer arm of the lever A is to be pulled upward, so as to draw the hoop upward and outward from the barrel, and loosen the hold of the nails by which the hoop may be confined in place.

The claw *a*, when furcated, as represented, renders the implement still further useful for the purpose for which it is designed.

The implement I have found to be of great advantage to a cooper, as it will enable him to loosen the hoops of a barrel and extract their holding-nails with great ease and efficiency.

I make no claim to a lever provided with a hooked claw pivoted to it.

Nor do I claim the combination and arrangement of a lever, a hammer-head, and a hooked claw, as represented in the United States patent, No. 73,923, dated January 28, 1868, and granted to Thomas J. Phillips.

My implement is not only different from that of Phillips, but is incapable of being used in the same manner, for, when that of Phillips is used, the hammer-head rests on the barrel-head, and the consequence is that the pressure exerted to loosen the hoop is likely to force in or injure the barrel-head; but with my implement, when used, the claw *a* of the lever A rests directly on the top of a stave of the barrel, and thus there is no pressure on the barrel-head.

Furthermore, with my implement the hooked claw, by means of the notches *b b*, can be adjusted to different depths below the lever A, so as to adapt the claw to a hoop when below the head of the barrel.

My implement can be worked to better advantage than the others heretofore referred to. Therefore,

I claim the implement herein described, consisting of the levers C and A, and fulcrum-pin *e*, when all the parts are constructed and arranged in the manner and for the purpose set forth.

CHESTER F. DEAN.

Witnesses:
R. H. EDDY,
F. P. HALE, Jr.